(12) United States Patent
Louderback et al.

(10) Patent No.: US 6,964,561 B2
(45) Date of Patent: Nov. 15, 2005

(54) HIGH-PERFORMANCE INFUSION SYSTEM FOR VARTM FABRICATION

(75) Inventors: Michael Louderback, Lake Forest, CA (US); Daniel Brennan, Lomita, CA (US); Raymond Cabales, San Diego, CA (US)

(73) Assignee: V System Composites, Inc., San Diego, CA (US)

( * ) Notice: Subject to any disclaimer, the term of this patent is extended or adjusted under 35 U.S.C. 154(b) by 0 days.

(21) Appl. No.: 10/420,398

(22) Filed: Apr. 22, 2003

(65) Prior Publication Data

US 2003/0211194 A1     Nov. 13, 2003

Related U.S. Application Data

(60) Provisional application No. 60/374,900, filed on Apr. 23, 2002.

(51) Int. Cl.[7] ............................................. B29C 70/48
(52) U.S. Cl. .................. 425/129.1; 425/112; 425/389; 425/406; 425/405.1; 425/546; 264/571; 264/510; 264/257
(58) Field of Search .......................... 425/129.1, 112, 425/389, 406, 405.1, 546; 264/571, 510, 264/257; B29C 70/48

(56) References Cited

U.S. PATENT DOCUMENTS

| | | | |
|---|---|---|---|
| 4,902,215 A | | 2/1990 | Seemann, III |
| 5,052,906 A | * | 10/1991 | Seemann ..................... 425/112 |
| 5,569,508 A | * | 10/1996 | Cundiff ........................ 428/117 |
| 5,885,513 A | | 3/1999 | Louderback et al. |
| 6,090,335 A | * | 7/2000 | McClure et al. ............. 264/510 |
| 6,555,045 B2 | | 4/2003 | McClure et al. |
| 6,556,411 B1 | | 4/2003 | Hoeft et al. |
| 6,565,792 B2 | * | 5/2003 | Hemphill ..................... 264/510 |
| 6,627,142 B2 | * | 9/2003 | Slaughter et al. ........... 264/510 |
| 6,630,095 B2 | * | 10/2003 | Slaughter et al. ........... 264/510 |

FOREIGN PATENT DOCUMENTS

EP             1 038 656 A1       9/2000

* cited by examiner

*Primary Examiner*—Robert Davis
*Assistant Examiner*—G. Nagesh Rao
(74) *Attorney, Agent, or Firm*—Stetina Brunda Garred & Brucker

(57) ABSTRACT

In the field of vacuum-assist-resin-transfer-mold (VARTM) processing, a new system is provided to lower production times and to create a high permeability mold cavity with reduced directionality to yield an optimum flow-front. The system comprises the use of a high permeability layer to evacuate air from the mold cavity and may include a reusable port-runner device for introduction of resin into the fiber mat. In the preferred embodiment, the high permeability layer is a "felt-like" material constructed of synthetic fibers, and the reusable port device is a flat, modular unit. In another embodiment, the high permeability layer is a fluid-impervious material with sporadic protrusions, and the reusable port-runner device is a flexible, silicone unit. Other embodiments are comprised of any combination thereof. Each embodiment is designed to minimize set-up times and to create a mold cavity with a low resistance to fluid flow through the application of pressure differentials.

23 Claims, 7 Drawing Sheets

HIGH-PERFORMANCE INFUSION SYSTEM FOR VARTM FABRICATION

CROSS-REFERENCE TO RELATED APPLICATIONS

This application claims priority to Provisional Application No. 60/374,900 for HIGH PERFORMANCE INFUSION SYSTEM FOR VARTM FABRICATION, filed Apr. 23, 2002.

STATEMENT RE: FEDERALLY SPONSORED RESEARCH/DEVELOPMENT

Not Applicable

BACKGROUND OF THE INVENTION

The present invention relates generally to the fabrication of fiber-reinforced plastic (FRP) components using the vacuum-assist-resin-transfer-mold (VARTM) approach, and, more particularly, to an improved method thereof.

In VARTM processing, dry fiber strips, plies, or mats are applied over a mold surface to form a fiber lay up of desired thickness. In addition, one or more closed-cell core layers may be included. A flexible, gas impervious sheet, liner, or bag is placed over the lay up to form a sealed vacuum envelope over the mold. Catalyzed resin is then injected into the mold through a series of disposable supply lines and conduits placed on or adjacent to the fiber lay up and allowed to "wet" the fiber mat to produce a fiber-reinforced plastic laminate.

A major disadvantage of this approach includes long setup times for the injection and vacuum ports/runners. Common practice is to assemble a series of tubes and connectors to a helical spring to create a manifold; see e.g., U.S. Pat. No. 4,902,215, issued to William Seeman on Feb. 20, 1990. This labor-intensive operation requires more up-front effort for fabrication and placement of these manifolds prior to the bagging operations. Another disadvantage is the long mold-filling time, resulting in elevated costs for consumable materials as well as touch labor. For large parts, the flow issue is increasingly problematic with the risk of resin cure prior to total mold fill, resulting in very expensive scrap parts.

Conventionally, there have been a number of ways to reduce the time standards associated with the VARTM process. Current techniques call for the use of a distribution media constituted of spaced-apart lines running crisscross one with another forming two sets of parallel lines which act as vertical pillars creating lateral passageways running in the direction of flow; see e.g., U.S. Pat. No. 4,902,215, issued to William Seeman on Feb. 20, 1990. Another design employs the use of resin conduits integral to a reusable silicone bag; see e.g., U.S. Pat. No. 5,316,462, issued to William Seeman on May 31, 1994.

Each of these techniques has drawbacks. A distribution media with lateral passageways provides a directionalized flow, leaving a potential for local dry spots throughout the laminate, which may result in costly rework or scrap. A reusable bag with integral resin conduits is specific to the geometry to be fabricated. This approach thereby yields a geometry-specific system, requiring specialized bags for different shapes and sizes. Both techniques increase skill and time requirements to fabricate a resultant article to meet the desired standards for cost and quality.

What is needed is a means of providing a non-directional, high-permeability system for VARTM applications, with a universal, modular, and reusable port-runner device.

BRIEF SUMMARY OF THE INVENTION

It is therefore an object of the invention to provide a high permeability mold cavity with reduced directionality to yield an optimum flow-front. It is another object of the invention to provide a modular port-runner device, used for both resin introduction and cavity evacuation, which is interchangeable for a variety of geometries. It is yet another object of the invention to provide an improved VARTM system to reduce the potential for rework or scrap, and to minimize set-up labor.

These and other objects are achieved according to the invention through the use of a high permeability layer (HPL) to quickly and thoroughly evacuate the air from the mold cavity, coupled with the use of a unique port-runner device that is reusable and interchangeable for a variety of laminate geometries.

In one embodiment, the HPL is comprised of a felt-like@ material, constructed of blown or cast synthetic fibers, such as a breather or vent material. The port-runner device is constructed of a rigid manifold, incorporating removable fittings for connection to the resin supply.

In another embodiment of the invention, the HPL is comprised of fluid-impervious material, such as silicone rubber or plastic, with non-directional protrusions on the fiber-interface side of the layer. The port-runner device is constructed of a flexible manifold suitable for contoured geometries.

In further embodiments of the invention, the system comprises any combination of a felt-like@ or fluid-impervious HPL, coupled with rigid or flexible port-runner devices.

In all embodiments of the invention described, the HPL is used to evacuate air from the mold cavity and to provide an optimum, non-directional flow-front in the fiber lay up, after introduction of the resin through a modular port-runner device and evacuation through the same. The accelerated evacuation of air from the mold cavity, coupled with the use of a modular port-runner device, lowers processing times with minimal potential for unimpregnated areas in the laminate.

BRIEF DESCRIPTION OF THE DRAWINGS

These as well as other features of the present invention will become more apparent upon reference to the drawings wherein.

DETAILED DESCRIPTION OF THE INVENTION

Reference is now made in detail to specific embodiments of the present invention, which illustrate the best modes presently contemplated by the inventors for practicing the invention. Alternative methods are also briefly described as applicable.

VARTM is described as a single tool surface form of liquid composite molding, whereby dry fiber material is placed on a mold, covered with a sheet, liner, or bag to create a sealed envelope, vacuum is drawn to evacuate air and compress the preform, and resin is introduced into the mold cavity to wet the fiber and to create a fiber-reinforced plastic laminate. Excess resin is pulled from the mold cavity through the vacuum port and captured in a resin trap. The present invention relates to VARTM processing for both solid laminates, as well as fiber-core-fiber sandwich structures.

In the preferred embodiments of the present invention below, the HPL is applied over the dry fiber material and placed in contact with both the modular infusion device and the vacuum outlet. Examples of presently preferred HPL material include Airtech N4, Airtech N10, Richmond A-3000, and Colbond EnkaFusion. A release film such as porous, release-coated fiberglass fabric or perforated film may be placed between the fiber and the HPL to prevent contamination with the cured laminate. The laminate stack is then covered with a fluid impermeable bag, or multiplicity thereof, to mitigate the risk of vacuum leaks. Connection of the HPL to the vacuum source facilitates evacuation of air from the mold cavity. It is known that using a vent or breather material in vacuum bag operations reduces evacuation time by over 10%. When vacuum is drawn through the cavity, the HPL creates a network of non-directional microcavities for the resin to travel. As resin is introduced into the mold cavity, the HPL provides flow in both the direction of infusion, as well as in the transverse direction, creating an optimal flow front, which in turn is distributed to the adjacent fiber mat. Thus, the combination of the modular resin infusion device and the HPL lead to reduced processing times and uniform wetting of the fiber mat.

Figure 1:
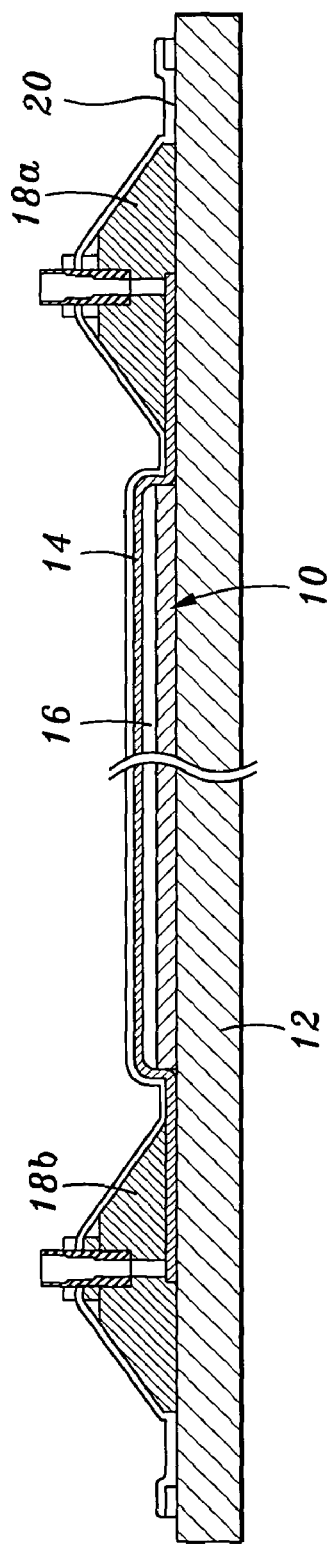
FIG. 1 is a perspective view in cross-section of an embodiment of the invention, illustrating a single layer of HPL.
Figure 2:
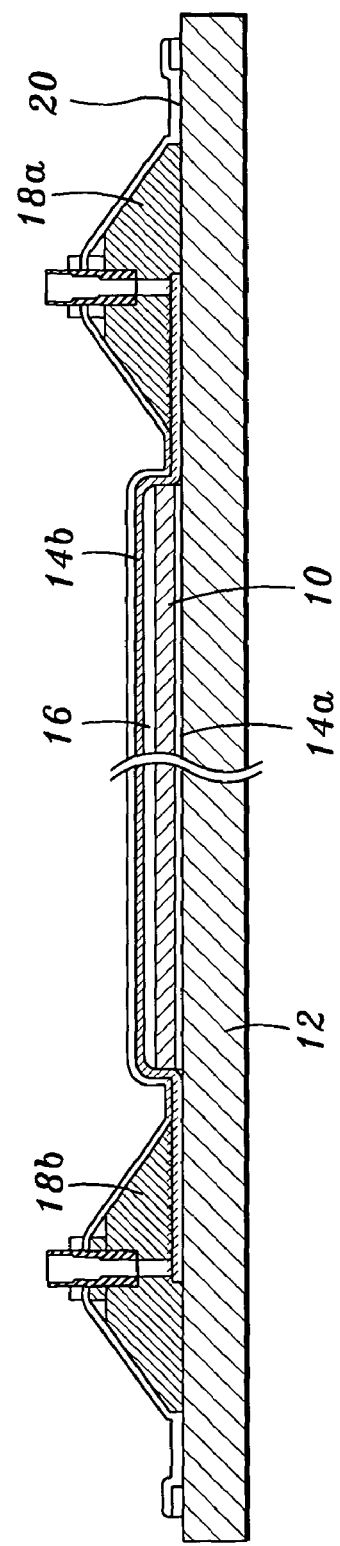
FIG. 2 is a perspective view in cross-section illustrating another embodiment of the invention, with HPL disposed on either side of the fiber lay up.

Such an embodiment is illustrated in FIG. 1. The fiber lay up 10 is placed over a mold 12, covered with the HPL 14, where the HPL is separated from the lay-up with a release film 16. Port-runner device 18a is placed at the resin inlet, and another port-runner device 18b, is placed at the vacuum outlet. Fluid impervious bag 20, is applied over the stack. For thicker structures, multiple layers 14a, 14b of HPL may be used to facilitate mold-filling time (FIG. 2).

Figure 3:
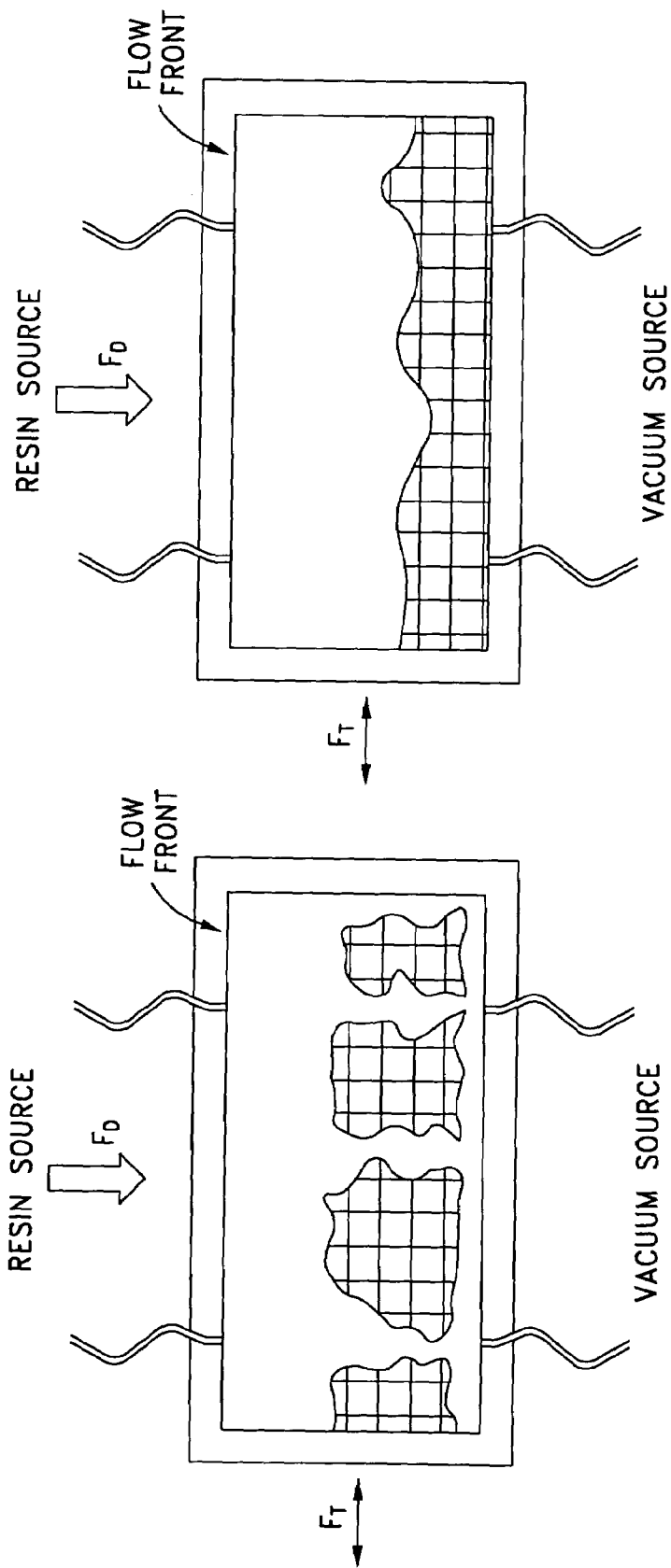
FIG. 3a is a graphical illustration of the flow-front achieved with the conventional approach.
FIG. 3b is a graphical illustration of the flow-front achieved with the current invention.

As illustrated in FIGS. 3a, 3b, the non-directional construction of the HPL provides a flow path in both the direction of vacuum, Fd, as well as in the transverse direction, Ft. Hence, the flow front is fully distributed over the fiber lay-up to produce a more uniform wetting. FIG. 3a is a graphical illustration of the flow-front achieved using conventional technology. FIG. 3b is a graphical illustration of the flow-front achieved utilizing the present invention. A comparison of the flow-fronts of FIGS. 3a, 3b demonstrates that conventional technology produces complete longitudinal flow-front prior to completion of a lateral flow-front, the lateral or transverse flow-front, FT. Such a result is inefficient insofar as it utilizes excess resin and requires additional time, thereby decreasing throughput. In some cases the flow may be interrupted to allow for resin to spread in a transverse direction through fully wet dry spots. More ideally the flow-front would be more even in the transverse direction, such that as the flow-front progresses longitudinally, it is more evenly distributed transversely, to the point that spreading is substantially complete as the flow-front reaches the posing longitudinal end of the lay-ups.

As explained more below the present invention allows more uniform flow-front to be developed as a consequence of utilizing high permeability layers define non-directional micro cavities that will more evenly distribute resin flow across the surface of the fiber lay-ups. Additional layers of high permeability material and/or absorptive material may be arrayed in areas of enhanced thickness, to allow pooling of the resin in such areas to reduce wetting time in those areas of increased thickness.

The fiber lay-ups may be composed of either a natural fiber (carbon, Kevlar, or boron) or a synthetic fiber (fiberglass or polyester). Sandwich structures may be formed of fiber lay-ups disposed on either side of a core material, where the core material can be closed-cell foam, balsa, or sealed honeycomb.

Figure 4:
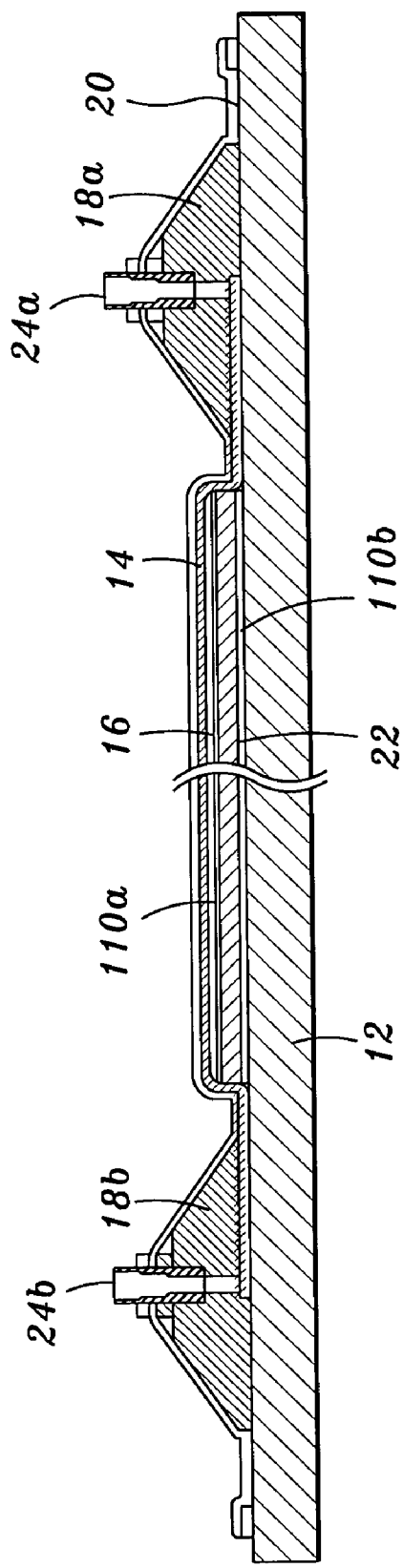
FIG. 4 is a perspective view in cross-section, illustrating the embodiment of the invention as applied to sandwich structures.

FIG. 4 depicts an embodiment as applied to a sandwich structure, where the fiber lay-ups 110a and 110b are disposed on either side of a core material 22. In this embodiment, the flow of resin can be further facilitated by applying grooves to the surface of the core. The grooves are typically sized to a maximum of 0.25-inch wide x. 25-inch deep and are located at 1.0-inch to 6.0-inch spacing along the face of the core. These grooves provide a path through the structure to facilitate evacuation of air through the fiber mat. Resin may or may not fill the grooves as it is infused through the fiber lay-ups.

Figure 5:
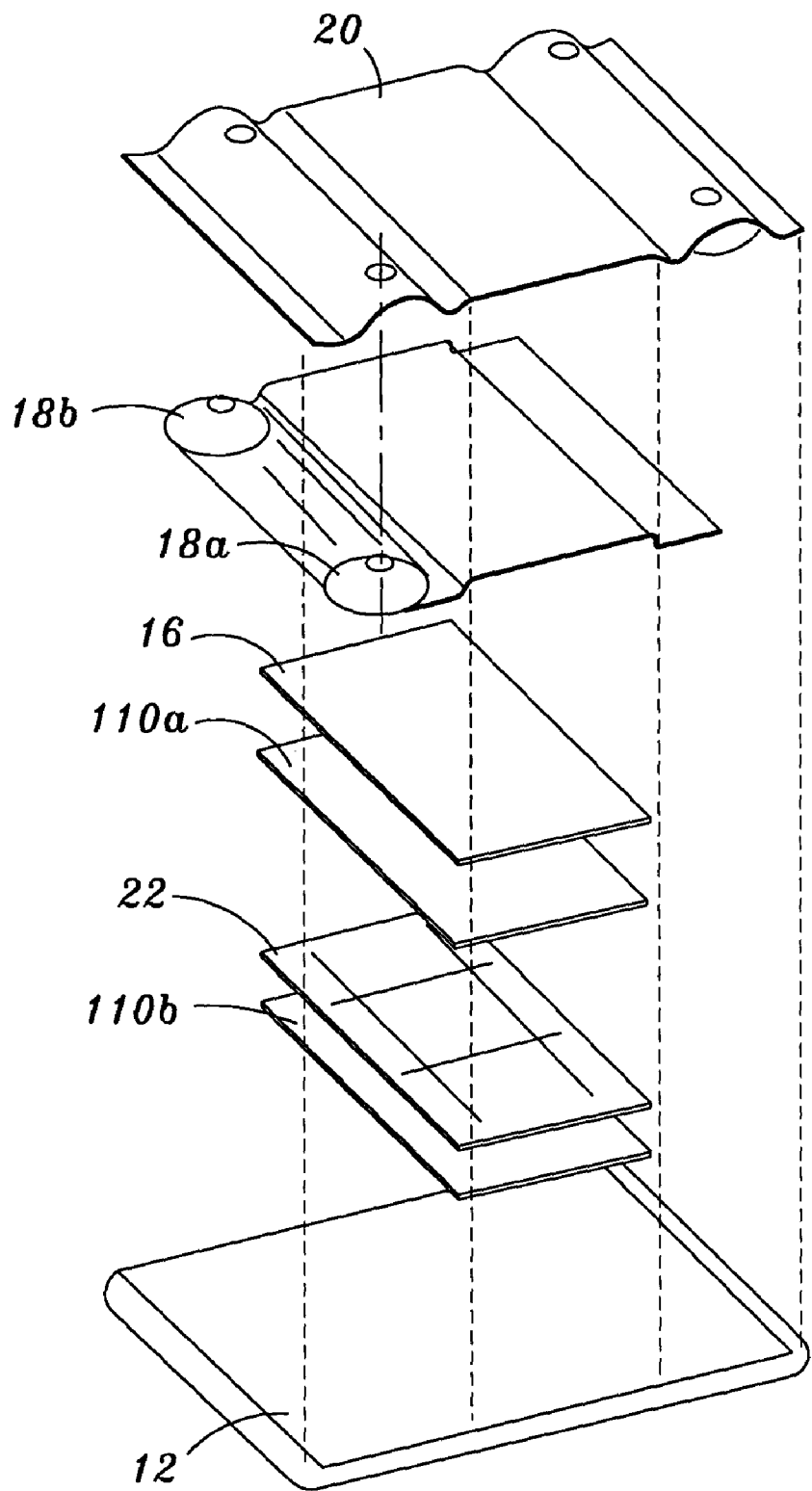
FIG. 5 is an exploded view illustrating an embodiment of the present invention.

Savings in processing time are also realized for setup of the mold utilizing port-runner devices, as shown at FIG. 5. The port-runner device may be constructed from a rigid material (metal, molded plastic, or composite) for simple geometries, or from a non-rigid material (e.g. cured silicone) for more complex shapes. The port-runner device may be stacked end-to-end along the lay-up to form manifolds for both the resin inlet as well as the resin outlet. The port fittings, 24b, of the rigid device, 18b, screw into the runner. In contrast, the port fittings, 24a, of the non-rigid device, 18a, only seat into corresponding locations in the runner. In either case, the bores of the port fittings are tapered, to facilitate removal of cured resin after demold. These universal devices are used over and over to minimize the costs of consumable materials.

Figure 7A:
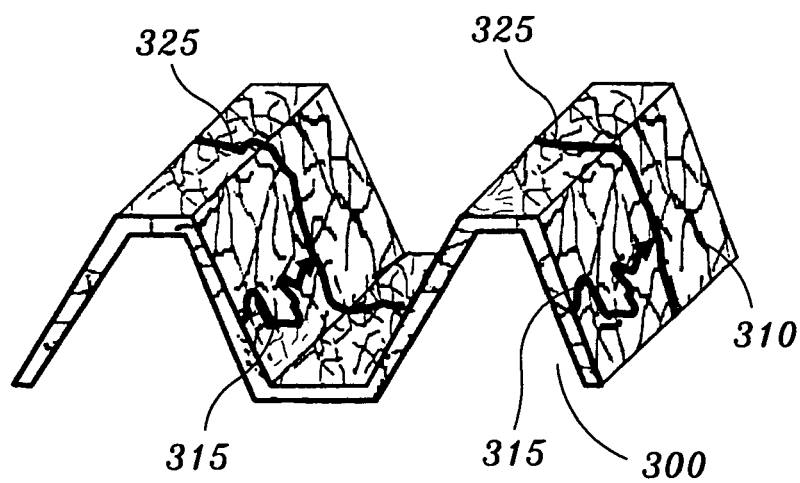
FIGS. 7a, b are cross sectional views of exemplary high permeability layers, illustrating plurality of fibers suspended in high permeability layer, and arranged in substantially random orientation.
Figure 7B:
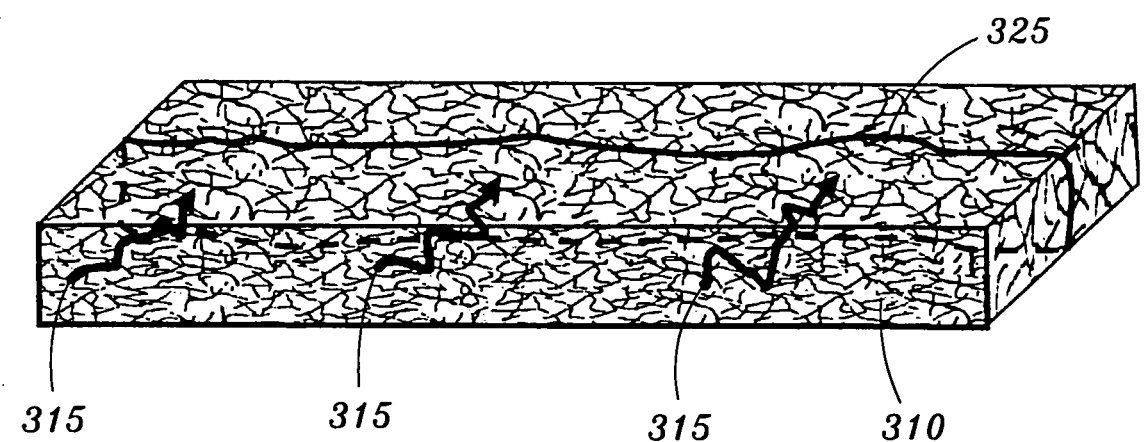

FIGS. 7a, 7b illustrate alternate embodiments of the HPL layer utilized in conjunction with the present invention. As noted above, HPL is formed as a network of non-directional cavities. FIG. 7a illustrates HPL 310 formed into a reticulated structure. FIG. 7b illustrates HPL 310 formed as a planner structure. In both FIGS. 7a, 7b HPL 310 is formed as a body of randomly oriented fibers defining microcavities to facilitate resin flow in transverse flow paths 315, as resin flow-front 325 progresses longitudinally along the length of the HPL. As noted above, the high permeability layer may be formed of felt, with felt fibers composed therein, or other constructions, such as blown material, having fiberglass or other such fibers randomly suspended therein. The fibers, in conjunction with other material in the high permeability layer, define a plurality of micro cavities, randomly oriented within the high permeability layer. The random cavities provide conduits for resin flow intermediate the ply lay-up and the fluid impervious liner.

As will be recognized by those skilled in the art, the HPL 310 may be formed to be more or less porous while still achieving non-directional fluid flow through the HPL. The more porous the HPL the faster the fluid flow through the HPL, and the less pooling of resin will occur. Where the HPL is less porous, the longitudinal flow-front will proceed more slowly, though pooling is enhanced. Where thinner lay-ups are present, it may be preferable to utilize a more porous HPL insofar as pooling is less of a necessity. However, in areas of thicker lay-ups, additional layers of HPL, which may be less porous and more absorptive, may be applied in order to retain a greater quantity of resin adjacent the areas of increased thickness. Put otherwise, the use of additional HPL layers, preferably of greater absorptivity, allows the resin to pool in selected areas such that the areas may be completely wet substantially at the same time that the flow-front completes passage across the part. Alternatively, absorptive material (not HPL) may be disposed on the HPL adjacent the selected areas. As a result, throughput of the manufacturing process is enhanced, resin usage is more efficient, and delays resulting from interruption of the resin introduction are mitigated, if not eliminated.

It will also be apparent from FIG. 7a, the HPL 310 defines channels 300 which may also allow for pooling of resin upon the surface of the lay-ups, and facilitate vacuum flow, to further enhance the part wetting rate.

Figure 8:
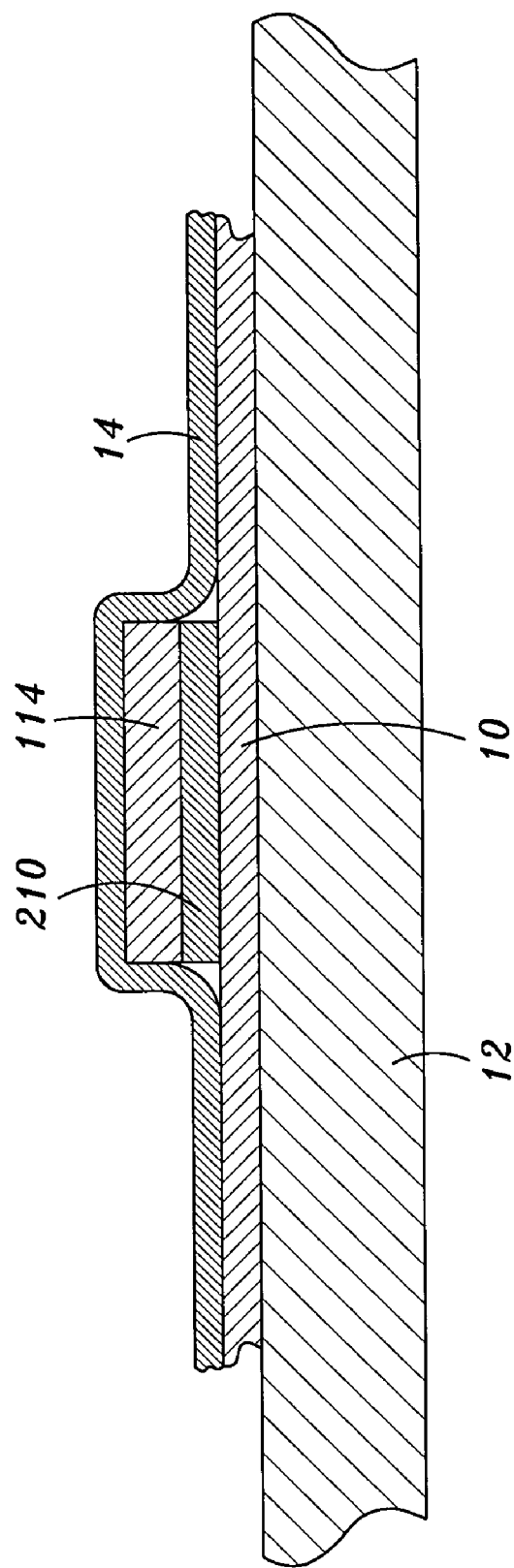
FIG. 8 illustrates a construction wherein at least one layer of absorptive material is applied adjacent the high permeability layer, adjacent areas where it is desirable to pool resin, e.g. where the ply lay-up is thicker.

FIG. 8 illustrates a construction wherein at least one layer of absorptive material 114; which may be a more absorptive form or HPL is provided adjacent the high permeability layer 210, where it is desirable to pool resin in areas where the ply lay-up has increased thickness. This occurs when integral doublers are placed to enhance the load carrying capability of the part. As such the absorptive layers are typically applied in sections, rather than across the entire lay-up. The absorptive layers may be comprised of more porous forms of high permeability layer or they may be formed by applying multiple layers of HPL. Conventional techniques require continuous infusion of resin over laminates with structural doublers. In contrast, the present invention allows for selective placement of high permeability layers and absorptive materials to provide complete and through wetting of the adjacent plies, thereby increasing throughput and efficiency over conventional methods. The teachings of the present invention may also be applied to very thick lay-ups to ensure uniform wetting in the most efficient manner. In order to achieve a substantially uniform flow front, and to ensure complete and thorough wetting of ply lay-ups with varying thicknesses, placement, and characteristics of the high permeability layer and absorptive materials are reviewed and selected for optimum results.

FIGS. 6a, b, c, d provide a graphical representation of how the present invention is effective to increase throughput. FIG. 6a illustrates the saturation curve for a part, where no HPL or absorbent material is applied to the part. As noted in FIG. 6a, the part reaches saturation, $S_p$ at time $T_p$. FIG. 6b illustrates the saturation curve for absorptive material that may be utilized in conjunction with the present invention. As shown at FIG. 6b, the absorptive material reaches saturation $S_a$, at time $T_a$. The absorptive material illustrated saturates more slowly then the part, such that saturation of the absorptive material occurs at time $T_a$, which is after saturation of the part, $T_p$.

FIG. 6c illustrates the saturation curve for HPL material which may be utilized in conjunction with the present invention. The fast HPL material shown at FIG. 6c reaches saturation, $S_f$, at time $T_f$, which is prior to the time that the part reaches saturation, $T_p$. As such, while the fast HPL material has some absorptive characteristics, they are less then the absorptive characteristics of the part and therefore allows fluid flow beyond areas of increased thickness, which areas have not yet reached saturation. The results for a part having thicker areas may be an uneven fluid flow-front, such is shown at FIG. 6a. In order to avoid such fluid flow-front, yet expedite the wetting process, additional layers of HPL, (preferably more absorptive HPL), or other absorptive material, may be applied in areas where the flow-front would otherwise proceed faster then the wetting rate of the fibers of the fiber lay-up. FIG. 6d provides a comparison of the saturation rate of the part alone (lower curve), in relation to the saturation rate of the part where layers or HPL and absorptive material are applied (upper curve). The HPL allows for enhanced distribution of the resin through microcavities in the HPL, to facilitate non-directional resin flow across the part, thereby enhancing the wetting rate. The placement of absorptive material in areas of increased part thickness allows continued application of additional resin to areas that wet more slowly, without reducing the wetting rate of the part as a whole. As a result, the time for saturation of the part, with the HPL and absorptive layer applied, may be reduced to an optimal time, $T_o$, which is less then the time necessary to saturate the part, by itself.

Figure 6:
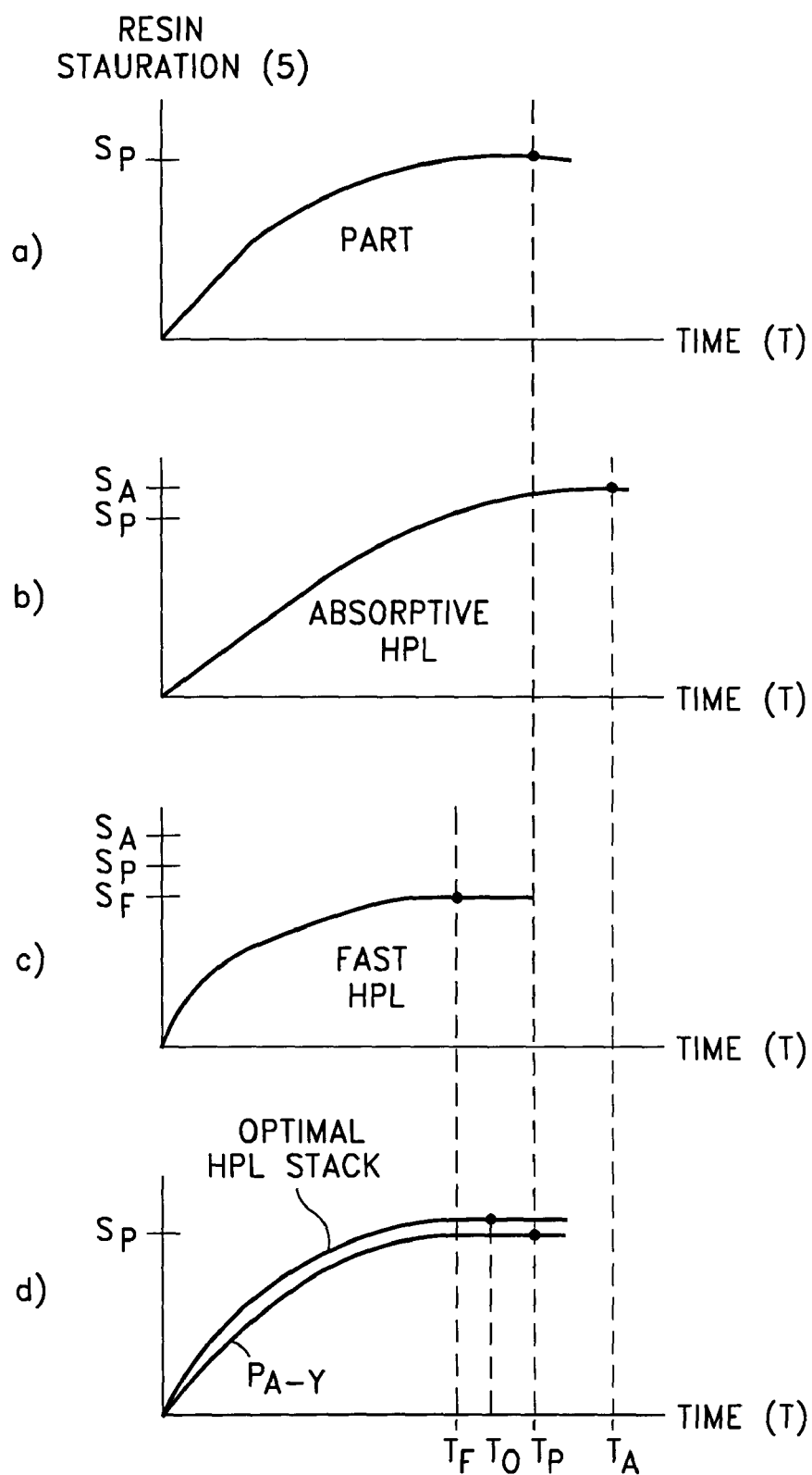
FIGS. 6(a–d) are graphical representations of saturation rates for a ply lay-up, absorptive layers, high permeability layers, and the optimum combination of high permeability layers and absorptive materials to obtain the most efficient system.

The system of the present invention can thus be designed with any of the described embodiments to selectively control the permeability of the lay-up. For instance, as applied to a sandwich structure with grooved core, the HPL can be isolated to the resin inlet and exit locations only. As the catalyzed resin is introduced into the mold cavity, the grooves in the core, acting as runners, distribute the resin through the fiber lay-ups and provide a path to the vacuum outlets. In the case where thickness is locally varied along the fiber lay-up to obtain integral doublers as shown in FIG. 8, resin is desired over the thicker areas to ensure full wetout. Therefore, a highly absorptive layer 114 is placed over the doubler areas, 210, to allow resin to concentrate and slowly saturate the fiber preform 10. The high permeability layer 14 is then draped over the stack to distribute resin to the adjacent plies. In practice, it is important to understand the characteristics of low, permeability, and saturation for wetting of the adjacent plies. As shown in FIG. 6, a highly absorptive material will fill slower and drain slower resulting in long, inefficient processing times. Contrastingly, a highly permeable material will wet out faster and consequently drain faster, resulting in less uniform wetting and potentially inadequate infusion through the thickness. Thus, the system of the present invention can be tailored to control the permeability and absorptivity of the HPL, using a multitude of materials, layers of the same materials, or combinations of materials for efficient and uniform distribution of risen.

The benefits of an efficient, high-flow system incorporating the teachings of the present invention extend into the design of the structure as well as fabrication. Utilizing a porous or open-weave material in the fiber stack up can significantly reduce the need for HPL over the entire lay-up, thereby further reducing the cost for consumable materials. The open-weave material will be co-cured to the structure, to provide a lattice of stiffening members in the through-the-thickness direction.

In another embodiment of the present invention, the high-permeability layer can be constructed from a fluid impermeable sheet with raised, sporadic protrusions on one side. The sheet can be manufactured from a cast and cured silicone rubber, allowing it to be used for multiple cycles. The use of such an apparatus similarly yields a non-directionalized flow front, producing a uniform wetting of the fiber lay-up.

The disclosed invention is expected to find use in all VARTM applications, as well as in other liquid molding techniques, where increased efficiencies are desired.

Thus, there has been disclosed a high-performance VARTM system. It will be apparent to those skilled in this art that various changes and modifications may be made; all such changes and modifications are considered to fall within the scope of this invention.

What is claimed is:

1. A vacuum-assist-resin-transfer-mold (VARTM) system for use in composite fabrication of fiber-reinforced plastic (FRP) structures using dry materials and catalyzed resin comprising:
   a) a mold surface;
   b) a fiber lay-up disposed upon the mold surface;
   c) at least one high permeability layer (HPL) disposed adjacent the fiber lay-up, each HPL defined by opposing first and second surfaces, and a length extending between a resin source edge and a vacuum source edge, each HPL including a body of randomly orientated fibers defining a plurality of non-directional resin flow paths within the HPL extending along the length of the HPL; and
   d) a fluid impermeable bag disposed over the at least one high permeability layer, the fiber lay-up and the mold surface;
   e) wherein each HPL is arranged to have resin introduced proximate the resin source edge, while simultaneously having a vacuum applied proximate the vacuum source edge, such that the resin is vacuum drawn through the resin flow paths and distributed upon the fiber lay-up.

2. The system of claim 1, wherein said lay-up is comprised of a fiber stack disposed on at least one side of a core material.

3. The system of claim 2, wherein said core is balsa.

4. The system of claim 2, wherein said core is a closed-cell foam.

5. The system of claim 2, wherein said core is a sealed honeycomb.

6. The system of claim 1, wherein said at least one high permeability layer is formed of blown synthetic fibers.

7. The system of claim 1, wherein the said at least one high permeability layer is formed of cast synthetic fibers.

8. The system of claim 2, wherein said core is grooved to facilitate distribution of resin to fiber stacks.

9. The system of claim 1, further comprising selected areas of thicker fiber lay-ups as compared to the rest of the fiber lay-up.

10. The system as recited in claim 9, further comprising at least one layer of absorptive material disposed between the at least one high permeability layer and the selected areas of thicker fiber lay-ups for enhancing the wetting rate of the selected areas of thicker fiber lay-ups.

11. The system as recited in claim 9, further comprising a plurality of high permeability layers stacked adjacent the selected areas of thicker fiber lay-ups to enhance the wetting rate.

12. The system as recited in claim 11, wherein the number of stacked high permeability layers is selected to substantially correspond to a desired wetting rate of the selected areas of thick fiber lay-ups.

13. A vacuum-assist-resin-transfer-mold (VARTM) system for use in composite fabrication of fiber-reinforced plastic (FRP) structures using dry materials and catalyzed resin comprising:
   a) a mold surface;
   b) a sandwich lay-up constituted of fiber material disposed on at least one side of a core material;
   c) at least one high-permeability layer (HPL) disposed adjacent the sandwich lay-up, each HPL defined by opposing first and second surfaces, a resin source edge and a vacuum source edge, each HPL including a body of randomly orientated fibers defining a plurality of non-directional resin flow paths within the HPL extending along the length of the HPL; and
   d) at least one resin port runner device attached proximate to the resin source edge of the at least one HPL for introducing resin into the at least one HPL;
   e) at least one vacuum port runner device attached proximate to the vacuum source edge of the at least one HPL for applying a vacuum to the at least one HPL; and
   f) a fluid impermeable bag disposed over the at least one resin and vacuum port runner devices, the at least one high permeability layer, the fiber lay-up and the mold surface;
   g) wherein the at least one HPL is arranged to have resin introduced proximate the resin source edge via the at least one resin port runner device, while simultaneously having a vacuum applied proximate the vacuum source edge via the at least one vacuum port runner device, such that the at least one HPL acts as a conduit which allows the resin to travel between the first and second surfaces of each HPL in a distributed flow front, both in a direction of the vacuum and in a direction transverse to the vacuum, while further simultaneously wetting the sandwich lay-up.

14. A vacuum-assist-resin-transfer-mold (VARTM) system for use in composite fabrication of fiber-reinforced plastic (FRP) structures using dry materials and catalyzed resin comprising:
   a) a mold surface;
   b) a fiber lay-up including an open weave material;
   c) at least one high-permeability layers (HPL) disposed adjacent the fiber lay-up, the HPL defined by opposing first and second surfaces, a resin source edge and vacuum source edge, each HPL including a body of randomly orientated fibers defining a plurality of non-directional resin flow paths within the HPL extending along the length of the HPL; and
   d) at least one resin port runner device attached proximate to the resin source edge of the at least one HPL for introducing resin into the HPL;
   e) at least one vacuum port runner device attached proximate to the vacuum source edge of the at least one HPL for applying a vacuum to the HPL; and
   f) a fluid impermeable bag disposed over the at least one resin and vacuum port runner devices, the at least one high permeability layer, the fiber lay-up and the mold surface;

g) wherein each HPL is arranged to have resin introduced proximate the resin source edge via the at least one resin port runner device, while simultaneously having a vacuum applied proximate the vacuum source edge via the at least one vacuum port runner device, such that the at least one HPL acts as a conduit allowing the resin to travel between the first and second surfaces of each HPL in a fully distributed flow front, both along in a direction of the vacuum and in a direction transverse to the vacuum, while also simultaneously wetting the fiber lay-up;

h) wherein said open weave material facilitates distribution of resin to said fiber lay-up and is ultimately co-cured within the fiber lay-up to provide a lattice of stiffening members within the fiber lay-up.

15. The system of claim 13, further including grooves disposed on at least one surface of the core material for facilitating evacuation of air from the sandwich lay-up and for facilitating the flow of resin into the sandwich lay-up.

16. A vacuum-assist-resin-transfer-mold (VARTM) apparatus for use in composite fabrication of fiber reinforced plastic (FRP) structures formed from a fiber lay-up and resin, the apparatus comprising:

a) a mold device having a mold surface adapted to receive a fiber lay-up;

b) at least one high permeability layer (HPL) defined by opposing first and second surfaces, a resin source edge and vacuum source edge, each HPL composed of a network of non-directional micro-cavities;

c) at least one resin port runner device attached proximate to the resin source edge for introducing resin into each HPL including a body of randomly orientated fibers defining a plurality of non-directional resin flow paths within the HPL extending along the length of the HPL; and d) at least one vacuum port runner device attached proximate to the vacuum source edge for applying a vacuum to each HPL; and e) a fluid impermeable bag disposed over the at least one resin and vacuum port runner devices, the at least one HPL and the mold surface;

f) wherein a mold cavity is provided between the mold surface and at least one HPL for receiving a fiber lay-up, the mold cavity adapted to have a vacuum applied thereto from the at least one vacuum port runner and to have resin introduced therein from the at least one resin port runner device, such that each HPL acts as a conduit allowing the resin to travel between the first and second surfaces of each HPL in a fully distributed flow front, both in a direction of the vacuum and in a direction transverse to the vacuum, while further being adapted to simultaneously wet a fiber lay-up contained within the mold cavity.

17. The apparatus as recited in claim 13 wherein the high permeability layer is formed of felt.

18. The apparatus as recited in claim 13 wherein the high permeability layer is formed of blown synthetic material having synthetic fibers suspended therein.

19. The apparatus as recited in claim 1 wherein the resin flow rate through the at least one high permeability layer exceeds the saturation rate of the fiber lay-up.

20. The apparatus as recited in claim 13 further comprising at least one layer of absorptive material exposed intermediate the at least one high permeability layer and the fluid impermeable bag, the at least one layer of absorptive material being effective to pool resin within the at least one layer of absorptive material to facilitate wetting of the sandwich lay-up.

21. The apparatus as recited in claim 13 wherein the permeability of the at least one high permeability layer is selected in view of the wetting rate of the sandwich lay-up in order to provide a substantially evenly distributed resin flow rate across the sandwich lay-up.

22. The apparatus of claim 13, said at least one resin and vacuum port runner device comprising a frusto-conical shaped device having a port disposed along a center axis thereof, wherein a base of the device is positioned on the resin source edge such that the port is in communication with the resin source edge of each HPL.

23. The apparatus of claim 22, further comprising port fittings installed into the port of each resin port runner device, the port fitting having an axial bore with a tapered profile to facilitate removal of cured resin.

* * * * *